April 18, 1950  C. O. ROTHWEILER  2,504,454
LEVELING DEVICE
Filed March 11, 1948

INVENTOR.
CHARLES O. ROTHWEILER
BY
Christian L. Nielsen.

Patented Apr. 18, 1950

2,504,454

UNITED STATES PATENT OFFICE 2,504,454

LEVELING DEVICE

Charles O. Rothweiler, Milwaukee, Wis., assignor to David White Company, Milwaukee, Wis.

Application March 11, 1948, Serial No. 14,255

2 Claims. (Cl. 248—180)

1

My invention relates to leveling devices and more particularly to a type of device that may be employed in the construction of transits or the like.

The object of my invention is to provide an adjustment screw that is totally enclosed and protected from the elements and foreign matter, thereby permitting minute adjustment.

Another object of my invention is to provide a minimum number of parts that are easily manufactured and assembled into a practical device.

Still another object of my invention is to provide a device that is easily manipulated, is applicable to many uses, and is efficient for the purpose for which it is intended.

It is manifest to anyone familiar with the art that it is often advantageous that the screw of a leveling device be protected from dust and dirt as well as the elements, to enable the user to obtain better adjustment, and by eliminating foreign matter the wear on the leveling screw is eliminated to a great extent.

Figure 1:
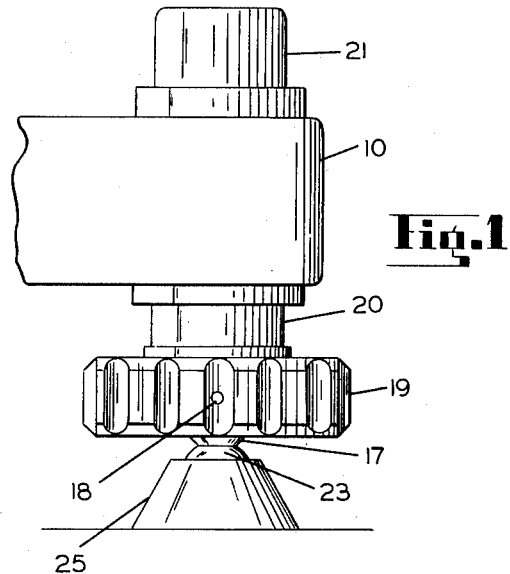

Other and further objects of my invention will become more apparent as the description proceeds and when taken in conjunction with the drawing in which Figure 1 is a fragmentary outer view of the assembled device.

Figure 2:
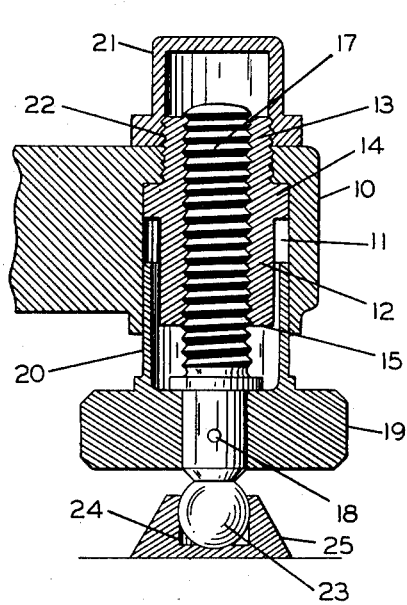
Figure 3:
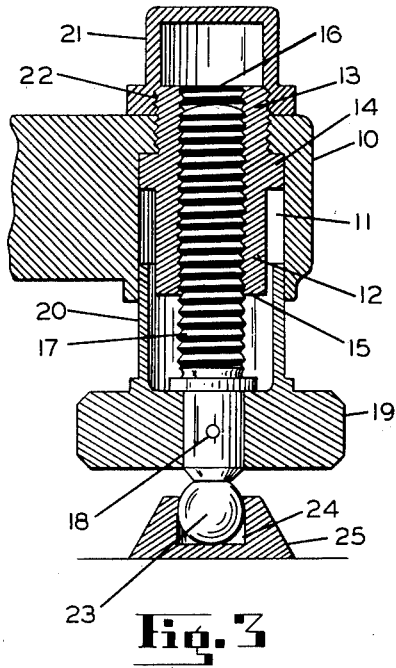

Figure 2 is a fragmentary cross-sectional view of the assembled device as shown in Figure 1, and Figure 3 is a fragmentary cross-sectional view of the device as shown in Figure 2, extended.

Similar characters of reference indicate corresponding parts throughout the several views, and referring now to the same, the body portion of the device leveled is shown as 10 in the various illustrations. This body portion 10 is provided with an aperture 11 having a greater diameter at its lower end and a narrower diameter at its upper end. The upper end of the aperture 11 is threaded to permit engagement of a threaded insert 12 which is shown having a threaded portion 13 for engagement with the threaded aperture in the main body portion 10. The threaded insert 12 is also provided with an outwardly extending flange 14 which engages the inner surface of the aperture 11, in the body portion 10. The threaded insert 12 is further provided with a downwardly extending portion 15, and the entire threaded insert 12 is provided with a vertical threaded aperture 16 extending centrally through its entire length.

There is an adjustment screw shown as 17 which is shown attached at 18 to a serrated adjustment member 19 which is provided with an

2 upwardly extending apron 20 which engages the lower portion of the aperture 11 in the body portion 10 being leveled. There is a dust cap shown as 21 threadedly engaging the upper portion of the threaded insert at 22 to protect the top of the adjustment screw 17 and this adjustment screw 17 is shown provided with a spherical portion 23 which engages a recess shown as 24 in the base 25 supporting the entire unit.

It is obvious that when the serrated adjustment member 19 is revolved it will revolve the adjustment screw 17 attached thereto and the apron portion 20 will slidably engage the inner face of the aperture 11 in the main body portion shown as 10, thereby permitting the adjustment screw 17 to be totally encased within a housing formed by the apron 20 and the dust cap 21, and eliminating any possibility of dust or the like entering the enclosure formed by the apron 20 on the cap 21.

In the chosen embodiments of my invention there are several features not heretofore disclosed in the prior art, and although I have shown a specific and particular arrangement of the component parts constituting the device, I am fully cognizant of the fact that changes may be made in the contour and configuration of the parts, and I reserve the right to make such changes without departing from the spirit of my invention or the scope of the appended claims.

Having thus described my invention what I claim and desire to secure by Letters Patent in the United States is:

1. A device of the character described to be used in combination with a body portion to be adjustably supported by a base, said body portion provided with an aperture, an insert threadedly engaging the upper portion of said aperture and extending outward from said body portion at its top, a dust cap threadedly engaging said insert at its top, the lower part of said threaded insert being of a diameter smaller than the diameter of said aperture, a threaded aperture centrally disposed extending longitudinally through said insert, an adjusting screw threadedly engaging the longitudinal aperture in said insert, said screw provided with an outwardly extending adjustment member rigidly attached thereto, an upwardly extending cylindrical apron forming a portion of said adjusting member, said apron surrounding said screw and engaging the inner wall of the aperture in said body portion, and a pivot portion at the lower end of said adjustment screw for contact with said base.

2. A device of the character described to be used in combination with a body portion to be adjustably supported by a base, said body portion provided with an aperture, an insert threadedly engaging the upper portion of said aperture and extending outward from the body portion at its top, the lower portion of said threaded insert being of a diameter smaller than the diameter of said aperture, a centrally disposed threaded aperture extending longitudinally through said insert, an adjusting screw threadedly engaging the longitudinal aperture, said screw provided with an outwardly extending adjustment member rigidly attached thereto, said adjustment member provided with an upwardly extending, cylindrically shaped apron surrounding said screw and engaging the inner wall of the aperture within said body portion, the lower end of said adjustment screw provided with a pivoted point for engagement with said base, and a dust cap engaging the upper portion of said insert for encasing the upper portion of said screw.

CHARLES O. ROTHWEILER.

REFERENCES CITED

The following references are of record in the file of this patent:

UNITED STATES PATENTS

| Number | Name | Date |
|---|---|---|
| 2,164,051 | Brunson | June 27, 1939 |
| 2,248,209 | Vacquier et al. | July 8, 1941 |
| 2,438,479 | Patrosio et al. | Mar. 23, 1948 |
| 2,440,211 | Rothweiler | Apr. 20, 1948 |

FOREIGN PATENTS

| Number | Country | Date |
|---|---|---|
| 114,036 | Great Britain | Mar. 18, 1918 |